June 1, 1965          D. E. BURNS          3,186,292

MUSIC TEACHING DEVICE

Filed March 28, 1963

INVENTOR.
DORIS E. BURNS
BY
*Joseph A. Brown*
ATTORNEY

United States Patent Office 3,186,292
Patented June 1, 1965

3,186,292
MUSIC TEACHING DEVICE
Doris E. Burns, 446 N. Queen St., Lancaster, Pa.
Filed Mar. 28, 1963, Ser. No. 268,702
2 Claims. (Cl. 84—470)

This invention relates to an aid for teaching music. More particularly, the invention relates to a teaching device to enable pupils to learn music note formation and time.

In teaching music, one of the more difficult problems is to teach children note formation and time. Note diagrams on paper or on a blackboard often fail to accomplish the desired result. Such presentations tend to bore the child, since they are in the abstract realm of composition.

One object of this invention is to provide a practical, physical means to aid a child in learning music note formation and time.

Another object of this invention is to provide a music teaching device comprising note components which may be assembled and disassembled to form various note forms.

Another object of this invention is to provide a music teaching device of the character described which comprises simply designed components easily handled and manipulated by a child.

Another object of this invention is to provide a music teaching device which when used by a child provides a tangible and basic understanding about notes and their formation.

A further object of this invention is to provide a music teaching device of the character described which is inexpensive to manufacture whereby it may be sold at low cost.

Other objects of this invention will be apparent hereinafter from the specification and from the recital in the appended claims.

Figure 1:
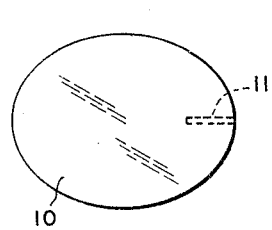
FIG. 1 is a side elevation of the basic whole note of the teaching device.

Referring now to the drawing by numerals of reference, and first to FIG. 1, 10 denotes a base piece which forms a master note. It is constructed of a single member of transparent, or at least translucent, colorless plastic in the form of an ellipse or oval. Preferably the size of master note 10 is such that it may be conveniently held in a child's hand. A note about two inches long, an inch and a half wide and one quarter inch thick has been found to be satisfactory. One end of the note has an angularly extending bore 11.

Figure 2:
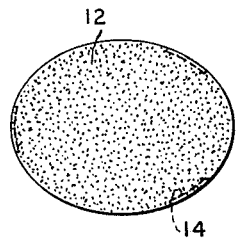
FIG. 2 is a side elevation of the darkening attachment for the whole note to make it into a fractional note.

Attachable to master note 10 is a darkening shield 12, FIG. 2, of such dimension that it may be placed on note 10 and provide a complete cover. Shield 12 may be made of sheet metal, plastic or any other material. Tabs 14 are formed on the shield to engage the periphery of note 10 and enable a frictional attachment of the parts.

Figure 3:
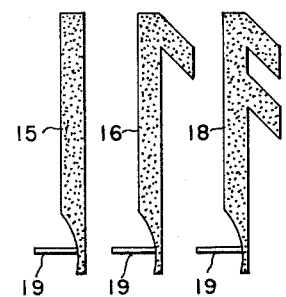
FIG. 3 is a side elevation showing a plain stem, a single flag and a two flag attachment for the basic whole note for forming fractional notes.

In FIG. 3, a plain note stem is shown at 15, a stem with single flag at 16 and a stem with double flag at 18. Each of these has a pin 19 projectable into bore 11 of master note 10 whereby various selected note combinations may be formed. The stem 15 and stems with flags 16 and 18 are so related in size to note 10 that when mounted thereon, the overall size of the note produced is dimensionally suitable.

Figure 4:
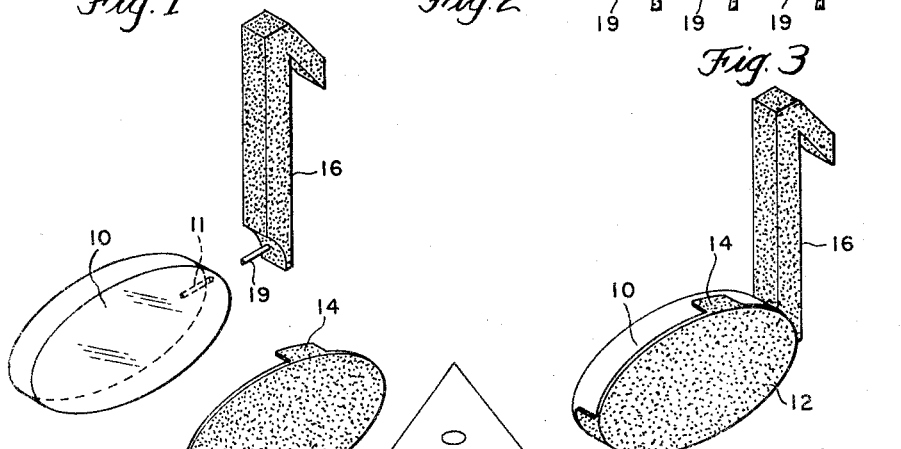
FIG. 4 is an exploded perspective view showing a combination of note components used to form an eighth note.
Figure 5:
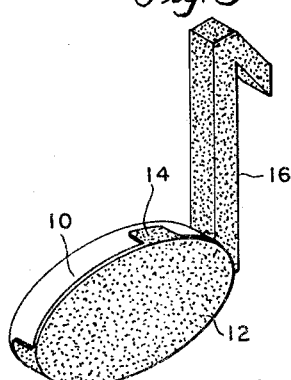
FIG. 5 is a perspective view of the same note components assembled.

To assemble an eighth note, the pupil uses a master note 10, the shield 12 and one flag stem 16. When the components are put together in the manner indicated in FIG. 4, an assembled note results as shown in FIG. 5.

Figure 6:
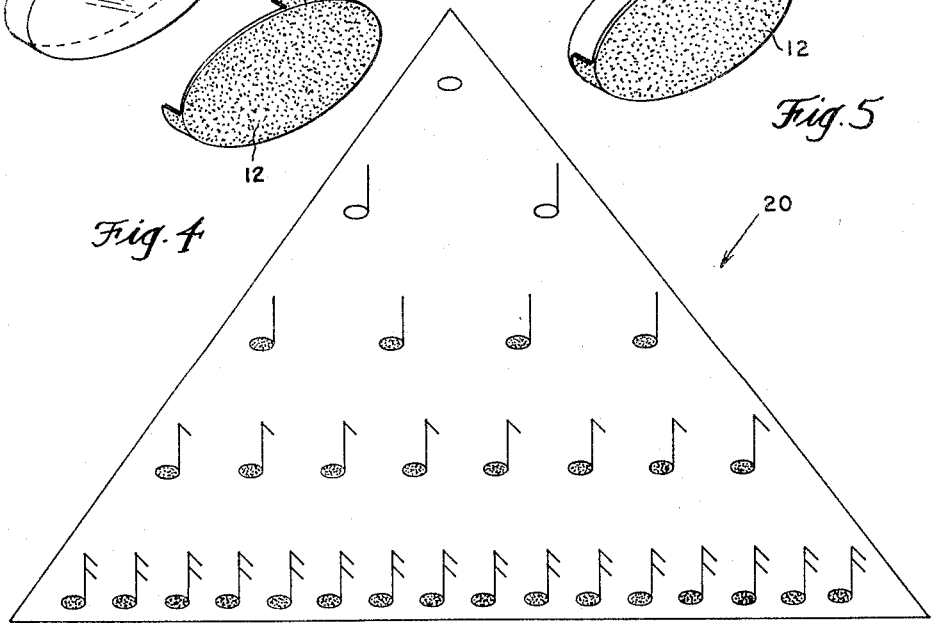
FIG. 6 is a chart showing note formations from a whole note to a sixteenth note and illustrating the components required for a full set of note components.

Along with the various parts used in constructing any note from a whole note to a sixteenth, a chart 20 is provided as shown in FIG. 6. The various note values are arranged in the general form of a triangle, with the single whole note at the top, followed by two half notes, four quarter notes, eight eighth notes and sixteen sixteenth notes. By using the chart, the child can be instructed and visually see that it takes two half notes to equal one whole note, or four quarter notes to equal a whole note. Such instruction can be coupled with actual assembling and disassembling of various note forms whereby the child learns that a whole note with a stem added to it becomes a half note; darkening the half note makes it a quarter note; adding a stem with a single flag to a darkened note results in an eighth note, while a two flag stem addition produces a sixteenth note.

If desired, a series of plastic notes may be provided equal in value to the notes shown on chart 20. A child can hold the notes and match them with other notes and equivalent notes. For a smaller less expensive set, only the components shown in FIGS. 1–3 would be provided so that any single note, from a whole note to a sixteenth may be formed.

In FIG. 6, a simple chart form has been illustrated. Various indicia, not shown, may be provided on the chart to supplement the showing of the notes and written instructions may be provided.

While this invention has been described in connection with a particular embodiment thereof, it will be understood that it is subject to various modifications without departing from the principle of the invention, and this application is intended to cover any variations, uses, or adaptations which come within the scope of the invention and the limits of the appended claims.

Having thus described my invention, what I claim is:

1. A device for teaching music note formation and time comprising a base piece representing a whole note and in the form of an oval or the like of a size adapted to be conveniently held in a child's hand, stem means, attachment means at one end of said stem means to detachably connect the stem means to said base piece, and thereby change the whole note to a half note, a darkening shield substantially the same size as said base piece, and means for detachably mounting said darkening shield on said base piece whereby said half note may be changed in value to a quarter note.

2. A device for teaching music note formation and time comprising a colorless base piece representing a whole note and in the form of an oval or the like of a size adapted to be conveniently held in a child's hand, said base piece having a bore, stem means, a pin on said stem means projectable into said bore to detachably connect the stem means to the base piece and thereby change the whole note to a half note, a darkening shield substantially the same size as said base piece, and a plurality of tabs on said darkening shield and engageable with said base piece to frictionally hold the shield thereon whereby the half note may be changed in value to a quarter note.

References Cited by the Examiner
UNITED STATES PATENTS

| | | | |
|---|---|---|---|
| 736,960 | 8/03 | Gusinde | 84—472 |
| 1,319,919 | 10/19 | Barker | 84—471 |
| 1,879,002 | 9/32 | Alles | 40—142 |
| 2,864,275 | 12/58 | Fraleigh | 84—471 |

FOREIGN PATENTS 170,640   3/60   Sweden.

LEO SMILOW, *Primary Examiner.*